US008194097B2

(12) United States Patent
Xiao et al.

(10) Patent No.: US 8,194,097 B2
(45) Date of Patent: Jun. 5, 2012

(54) VIRTUAL MASKING USING RIGID PARAMETRIC MODELING

(75) Inventors: Jing Xiao, Cupertino, CA (US);
Kar-Han Tan, Santa Clara, CA (US);
Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 714 days.

(21) Appl. No.: 12/333,623

(22) Filed: Dec. 12, 2008

(65) Prior Publication Data

US 2010/0150406 A1    Jun. 17, 2010

(51) Int. Cl.
*G09G 5/00* (2006.01)
*G06T 15/00* (2011.01)
*G06K 9/00* (2006.01)

(52) U.S. Cl. ................... 345/619; 345/419; 382/118

(58) Field of Classification Search .......... 345/619, 345/629–464; 382/118, 154, 195, 201, 203, 382/212–213, 216, 220, 275–276, 282–284
See application file for complete search history.

(56) References Cited

U.S. PATENT DOCUMENTS

| 5,613,048 | A | 3/1997 | Chen et al. |
| 6,484,101 | B1 | 11/2002 | Lucas et al. |
| 6,879,709 | B2 | 4/2005 | Tian et al. |
| 6,919,892 | B1 | 7/2005 | Cheiky et al. |
| 7,015,926 | B2 | 3/2006 | Zitnick, III et al. |
| 7,113,635 | B2 | 9/2006 | Robert et al. |
| 7,123,262 | B2 | 10/2006 | Francini et al. |
| 7,123,263 | B2 | 10/2006 | Harvill |
| 7,126,598 | B2 | 10/2006 | Oh et al. |
| 7,127,081 | B1 | 10/2006 | Erdem |
| 7,142,698 | B2 | 11/2006 | Liu et al. |
| 7,152,024 | B2 | 12/2006 | Marschner et al. |
| 7,158,658 | B2 | 1/2007 | Liu et al. |
| 7,227,567 | B1* | 6/2007 | Beck et al. ............... 348/14.07 |
| 2001/0020946 | A1* | 9/2001 | Kawakami et al. ........... 345/582 |
| 2002/0041285 | A1 | 4/2002 | Hunter et al. |
| 2003/0034988 | A1* | 2/2003 | Raskar ....................... 345/629 |
| 2005/0226509 | A1 | 10/2005 | Maurer et al. |
| 2006/0215016 | A1 | 9/2006 | Cohen et al. |
| 2006/0268101 | A1* | 11/2006 | He et al. ................. 348/14.12 |
| 2009/0073265 | A1* | 3/2009 | Greenhill et al. ............. 348/148 |

FOREIGN PATENT DOCUMENTS

WO    99/35606 A1    7/1999

OTHER PUBLICATIONS

Wolberg, "Image morphing: a survey", The Visual Computer 1998, 14: p. 360-372.*
La Cascia et al. "Fast, Reliable Head Tracking under Varying Illumination", BU CS TR98-018 Rev.2, Proc. IEEE Conf. on Computer Vision and Pattern Recognition, Jun. 1999.*
Beier "Feature-Based Image Metamorphosis", ACM SIGGRAPH Computer Graphics, vol. 26, Issue 2, Jul. 1992.*
Chen et al. "Interactive Shape Metamorphosis", I3D'95 Proceedings of 1995 Symposium on interactive 3D Graphics, 1995.*

(Continued)

*Primary Examiner* — Xiao M. Wu
*Assistant Examiner* — Yingchun He

(57) ABSTRACT

Disclosed are systems and methods for masking at least a portion of one image with another image. Aspects of the present invention facilitate the placing of a virtual mask onto an item in an image even if that items moves in subsequent images, such as between different image frames in a video.

18 Claims, 9 Drawing Sheets

OTHER PUBLICATIONS

Pighin et al. (Realistic Facial Animation Using Image-Based 3D Mo.*

Bregler, C., et al., "Tracking People with Twists and Exponential Maps", Jun. 23, 1998.

Liu, Z., et al., "Robust Head Motion Computation by Taking Advantage of Physical Properties", Jan. 2000.

Xiao, J., et al., "Robust Full-Motion Recovery of Head by Dynamic Templates and Re-registration Techniques", Proceedings of the Fifth IEEE International Conference on Automatic Face and Gesture Recognition (FG'02) May 2002, pp. 156-162.

Jebara, T. S., et al., "Parametrized Structure from Motion for 3D Adaptive Feedback Tracking of Faces", MIT Media Laboratory, Perceptual Computing Technical Report #401, Nov. 28, 1996.

Wei, T., et al., "Height from Gradient with Surface Curvature and Area Constraints", Center for Image Technology and Robotics Tamaki Campus, Univ. of Auckland, CITR-TR-109, Dec. 2001.

* cited by examiner

VIRTUAL MASKING USING RIGID PARAMETRIC MODELING

CROSS-REFERENCE TO RELATED APPLICATION

This application is related to commonly-owned U.S. patent application Ser. No. 12/174,513, entitled "Model-Based Error Resilience In Data Communication," filed on Jul. 16, 2008, listing Anoop Bhattacharjya and Jing Xiao as inventors, which application is hereby incorporated by reference in its entirety.

BACKGROUND

A. Technical Field

The present invention relates generally to systems and methods for processing data. And, the present invention relates more particularly to systems and methods for masking at least a portion of an image with another image.

B. Background of the Invention

A digital image typically comprises an array of picture elements. Each picture element, also known as a "pixel," has a value and a location within the array. The value associated with the pixel represents its color (which shall be construed to include intensity for grayscale images).

At the lowest level, a digital image is a collection of pixel; but, at a higher level, pixels of the image may be grouped together into one or more groups that represent items within the image. For example, a group of pixels in an image may depict a face, a cup, a ball, a truck, landscape, or any other item. By identifying content within an image, one portion of the image may be processed differently than another portion. However, it can be very difficult to identify content within the image by examining the pixels. Furthermore, if the image is part of a set of images, such as a video, an item of interest in the image may move within subsequent images. The motion of the item between images greatly adds to the complexity of trying to identify and track the item within the images.

SUMMARY OF THE INVENTION

The present invention provides methods and systems for masking at least a portion of one image with another image. Aspects of the present invention facilitate the placing of a virtual mask onto an item in an image even if that items moves in subsequent images, such as between different image frames in a video. By way of illustration and not limitation, placing a mask on a user's face can be a popular feature for a number of applications, such as video conferencing or online gaming. In video conferencing, this feature allows the users to be visually anonymous and yet have an appearance of their preference, rather than simply covering the user's face with a black or otherwise meaningless block. Furthermore, in online gaming, this feature helps the users to not only psychologically imagine that they are the characters in the games but also helps the users to visually see that they are the characters in the games.

In such applications, usually a video camera is used to monitor a user. Since the user often moves and turns his or her face, a three-dimensional (3D) face tracker may be employed to recover the 3D orientation and position of the face in images captured by the camera. The recovered 3D poses may then be used to generate a composite image of a virtual facial mask covering the user's face in the captured image. For example, in video conferencing, a user selects a mask image, and during the video conference, the 3D face pose is tracked and used to properly warp the selected mask image onto the user's face in a captured image. Since the 3D facial movement is compensated for when placing the virtual mask into the captured image, the mask moves coincidently with the face, and it appears as if the user physically wears a mask. It shall be noted that facial masking is used herein as an illustration of an application of the present invention; however, it shall be noted that other items may be masked.

In embodiments, a method for masking for a target item in an image includes constructing a three-dimensional rigid parametric model of the target item. In a captured image that includes the target item, the three-dimensional pose information of the target item in a captured image is extracted. In embodiments, the three-dimensional pose information of the target item in a captured image is obtained using the three-dimensional rigid parametric model. A mapping between a mask image and a target image of the target item is constructed to obtain a mapped mask image, which is warped to the three-dimensional rigid parametric model. A composite image may be formed by projecting at least some of the pixels of the warped mapped mask image to pixel locations in the captured image using the three-dimensional orientation and position information of the item in the captured image.

In embodiments, the method of forming a composite image includes blending at least some of the pixels projected from the warped mapped mask image with pixels of the captured image. In embodiments, blending the pixels may be done using alpha blending. For example, in embodiments, the color at a pixel location in the composite image may be set as a sum of a first weight factor times the projected pixel's color value in the warped mapped mask image and a second weight factor times the corresponding captured image pixel's color value. In embodiments, the first and second weighted factors may depend upon a distance of the pixel location from a boundary of the mask image. In embodiments, blending is performed by using at least some of the pixels projected from the warped mapped mask image to replace the corresponding pixels of the captured image.

In embodiments, the method of masking an image may also include selecting a target image, which may be performed automatically or with user input.

In embodiments, the masking of the target item may be applied to a series of images, such as a video. In embodiments, the target item is tracked in subsequent images using the parametric model, and the target item is masked in the composite image.

In embodiments, a system for masking a target item in an image, the system comprises a model generator, coupled to receive information regarding a target image of the target item, that constructs a three-dimensional rigid parametric model of the target item; a mapper that construct a mapping between a mask image and the target image to obtain a mapped mask image; a warper that warps the mapped mask image to the three-dimensional rigid parametric model; a three-dimensional pose estimator that obtaining three-dimensional orientation and position information of the target item in a captured image; and a projector that projects at least some of the pixels of the warped mapped mask image to pixel locations in the captured image using the three-dimensional orientation and position information of the target item in the captured image to determine the pixel locations in the captured image; and an image blender that blends at least some of the pixels projected from the warped mapped mask image with corresponding pixels of the captured image to generate a composite image. In embodiments, the system further includes an image selector that facilitates selection of the target item in an image, such as an input image, a target image, or a captured image.

In embodiments, the present invention may be embodied in a computer-readable medium comprising one or more sequences of instructions which, when executed by one or more processors, cause the one or more processors to perform one or more of the methods disclosed herein.

Certain features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
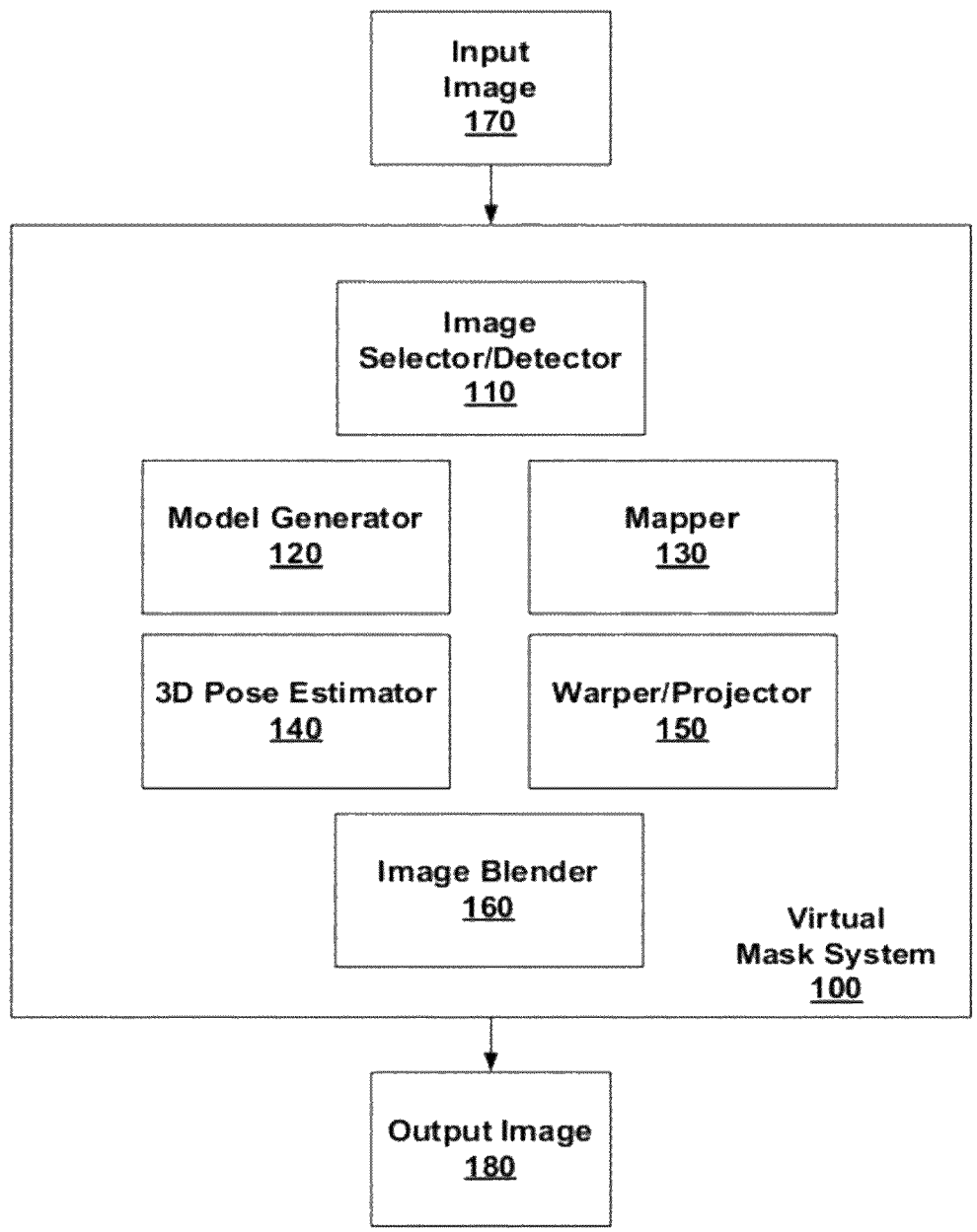
FIG. 1 depicts a virtual mask system according to embodiments of the present invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including (without limitation) cameras, printers, scanners, multiple function devices, facsimile machines, multimedia devices, gaming systems, and any other device that processes, captures, transmits, or stores data. The embodiments of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

It shall be noted that the examples provided herein are provided by way of illustration and not limitation. One skilled in the art shall recognize that the present invention can be applied to other situations, including without limitation to other image items.

A. Overview

Aspects of the present invention facilitate the placing of a virtual mask onto an item in an image even if that items moves in subsequent images, such as between different image frames in a video. By way of illustration and not limitation, placing a mask on a user's face can be a popular feature for a number of applications, such as video conferencing or online gaming. In video conferencing, this feature allows the users to be visually anonymous and yet have an appearance of their preference, rather than simply covering the user's face with a black or otherwise meaningless block. Furthermore, in online gaming, this feature helps the users to not only psychologically imagine that they are the characters in the games but also helps the users to visually see that they are the characters in the games.

In such applications, usually a video camera is used to monitor a user. Since the user often moves and turns his or her face, a three-dimensional (3D) face tracker may be employed to recover the 3D orientation and position of the face in images captured by the camera. The recovered 3D poses may then be used to generate a composite image of a virtual facial mask covering the user's face in the captured image. For example, in video conferencing, a user selects a mask image, and during the video conference, the 3D face pose is tracked and used to properly warp the selected mask image onto the user's face in a captured image. Since the 3D facial movement is compensated for when placing the virtual mask into the captured image, the mask moves coincidently with the face, and it appears as if the user physically wears a mask. It shall be noted that facial masking is used herein as an illustration of an application of the present invention; however, it shall be noted that other items may be masked.

B. System Embodiments

FIG. 1 depicts an embodiment of a virtual masking system 100 according to embodiments of the present invention. System 100 receive one or more images 170, which images may be received from an image capture device, such as a camera, scanner, etc., or which may be received from a stored file or filed, and produces an output image 180 wherein an item in the image (or images) is masked by a mask image. As an overview, system 100 includes an image selector/detector 110 that facilitates the selection and/or detection of a target image in the input images 160, a model generator 120 that generates a three-dimensional rigid parametric model of the target image, a mapper 130 that generates a mapping between the target image in an input image and a mask image, a three-dimensional pose estimator 140 that estimates three-dimensional pose information of the target image in an image, and a warper or projector 150 that can warp an image to the model and can receives the pose information (orientation and location) for the target image in a captured image and uses that information and the mapped masked image that has been warped to the three-dimensional rigid parametric model to project the mask into its proper position in the captured image. In embodiments, system 100 also includes an image blender 160 that blends pixel of the captured image with the projected mapped mask image to produce the output image 180, which may also be referred to herein as a composite image. It shall be noted that the term "color" (as in "pixel color values") shall be construed to mean the values that affect the pixel's appearance regardless of the color model used (e.g., Red-Green-Blue, Hue-Saturation-Value, Hue-Saturation-Lightness, etc.) and shall also be construed to include black and white pixel values and grayscale pixel values. Each of these modules (110-160) in the mask system 100 shall be described in more detail below.

As noted previously, image selector/detector 110 facilitates the selection and/or detection of an item in the input images 170. In embodiments, image selector/detector 110 allows a user to select manually an item within the image. For example, image selector/detector 110 may allow a user to identify an item by selecting a portion of the image (e.g., highlighting the portion, clicking and dragging over the portion, selecting points to define a region, etc.). In embodiments, image selector/detector 110 may comprise an automated detector, which automatically identifies the item in the image. For example, in embodiments, a face detector may be employed by image selector/detector 110 to detect a face target image. In embodiments, a user may select an image or identify a frame in a pre-recorded image sequence and an automated image detector identifies the item within the specified frame. One skilled in the art shall recognize that any of a number of face recognition or item recognition methods or systems may be employed and that no particular method or system is critical to the present invention.

Figure 6:
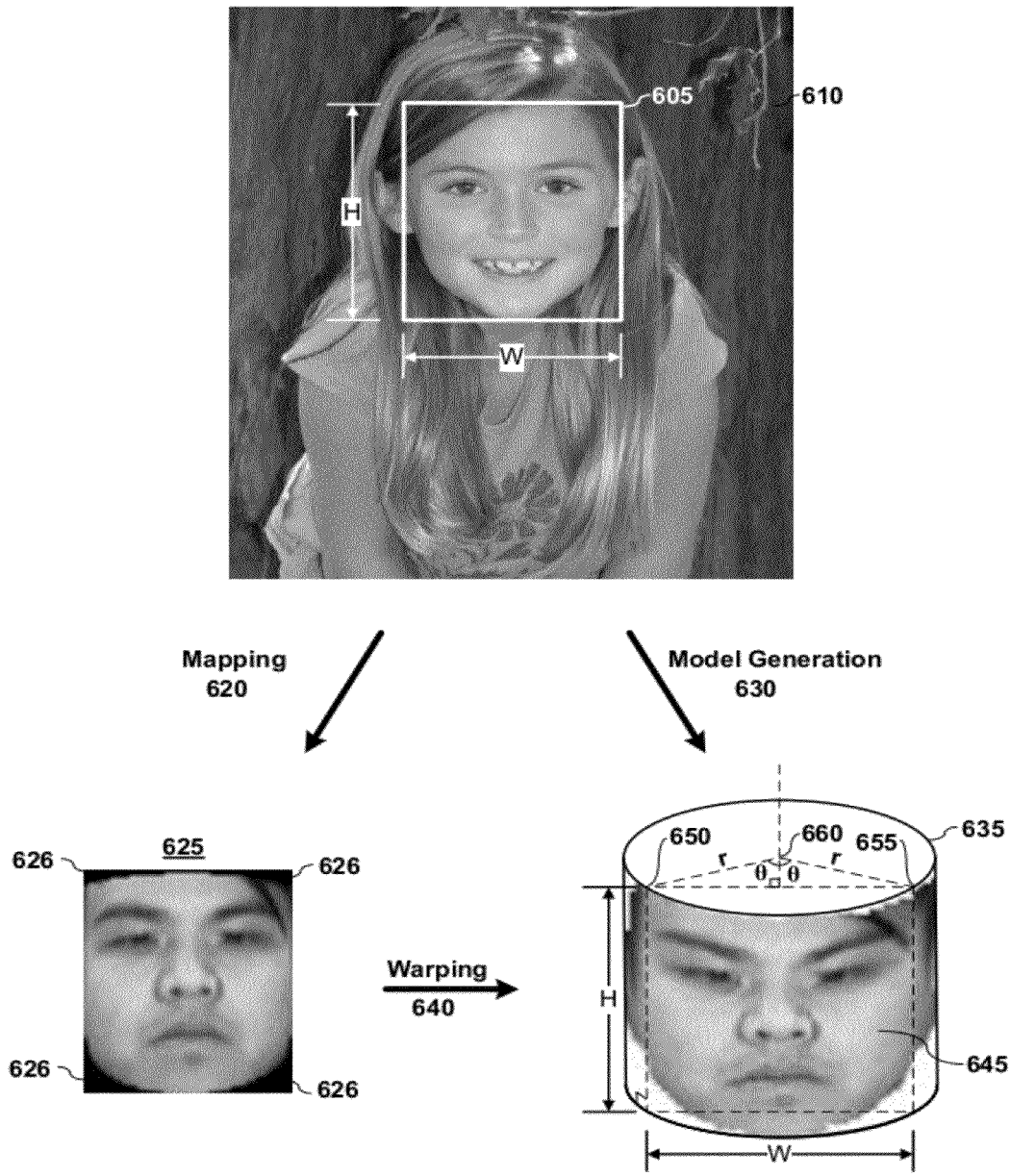
FIG. 6 depicts an example target image, an example mapped mask image, and an example warped mapped mask image according to embodiments of the present invention.

The selected image of the item may be referred to herein as the target image. By way of illustration and not limitation, FIG. 6 depicts an input image 610 from which a target image 605 has been selected. In the depicted example, the target image 605 is a face.

Given an initial target image of an item and its corresponding pose, a rigid parametric model can be created. In embodiments, the initial pose may be assumed to be frontal. In embodiments, the model generator 120 receives a target image from the image selector/detector 110 and fits the target image to a three-dimensional (3D) rigid parametric model.

Consider, by way of illustration and not limitation, the following example. Given a rectangular target image and the pose of the item in the target image, a three-dimensional cylindrical model may be generated using the dimensions of the target image. In embodiments, the target image height is used to calculate the height of the cylindrical model, and the target image width is used to calculate the cylindrical model radius.

FIG. 6 illustrates an embodiment of a method for defining the geometry of the cylindrical model. As illustrated in FIG. 6, given a target face image 605 having a height H and a width W, the cylindrical model height may be set as H and its radius r may be set as $W/(2*\sin(\theta))$. In the depicted embodiment, given a plane that is parallel to the central axis 660 of the cylinder and positioned such that the intersection of the plane and the cylinder produces a rectangular intersection having height H and width W, the angle $\theta$ is the interior angle between the line that bisects the width W of the rectangular intersection and terminates at the central axis 660 of the cylinder and the radius line that commences at the central axis 660 and terminates at a corner 650/655 of the rectangular intersection. In embodiments, $\theta$ is set as 60 degrees. It should be noted that other geometric model configurations may be used and other $\theta$ values may be used.

In alternative embodiments, the operation of model generation given a target image may be performed by one or more of the other modules.

In embodiments, system 100 may also receive input from a user regarding the selection of a mask image. The mask image may be selected from a library or list of images, may be provided by a user, and/or may be selected by a user from within an image. In embodiments, a default mask image may be set. In embodiments, mapper 130 receives input from a user regarding the selection of a mask image.

Given a mask image, mask mapper 130 generates a mapping between the target image and a mask image. In embodiments, the mask image is scaled such that it has the same size as the specified target image and thus there is a mapping between the scaled mask image and the specified target image.

Figure 2:
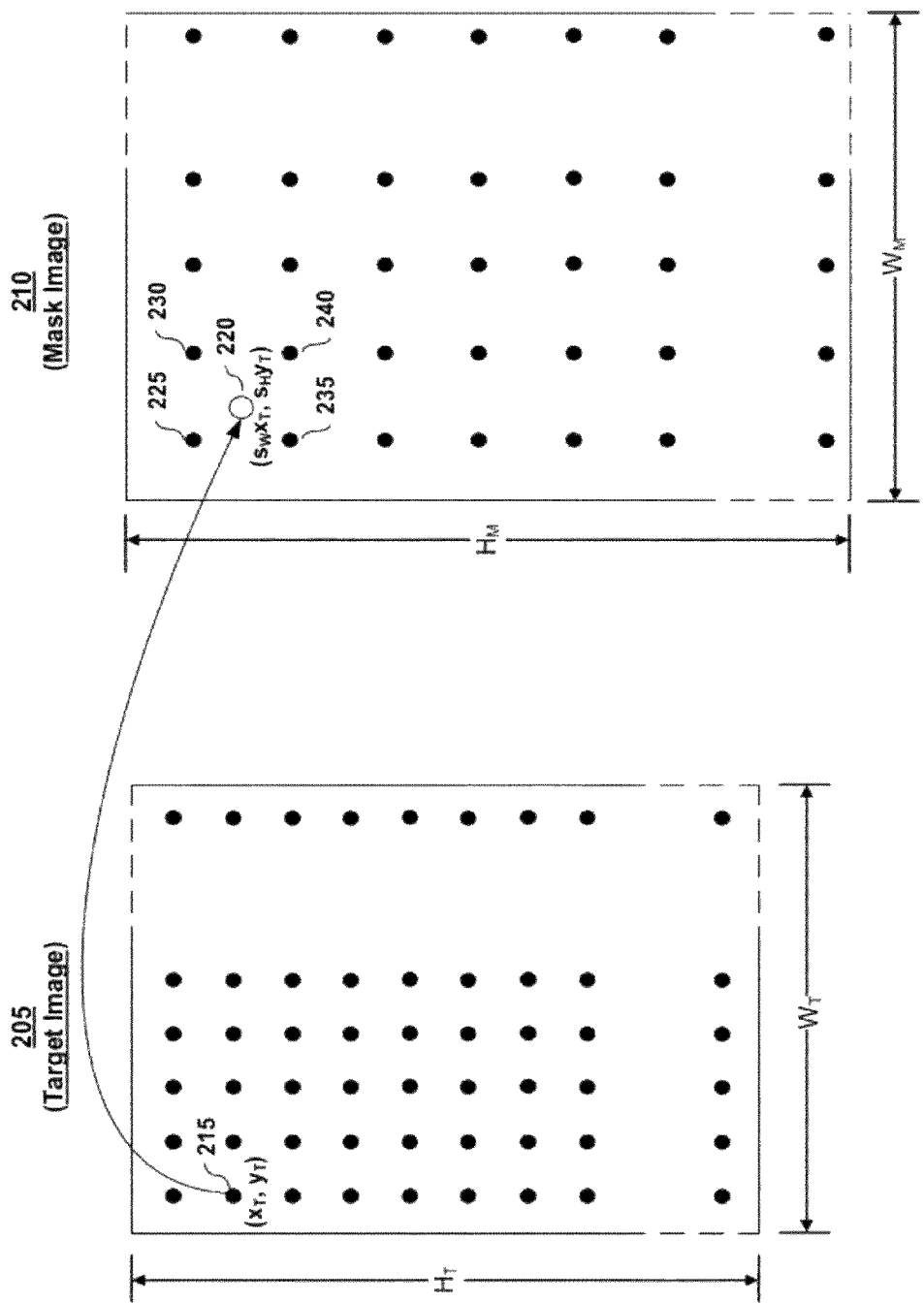
FIG. 2 depicts mapping between a target image and a mask image according to embodiments of the present invention.

In embodiments, scaling and bi-linear interpolation may be used to generate the mapping between the mask image to the target image. For example, as illustrated in FIG. 2, given a target image 205 with rectangular dimensions of $H_T$ and $W_T$ and a mask image 210 with rectangular dimensions of $H_M$ and $W_M$, the height and width scaling factors ($S_H$ and $S_W$, respectively) can be calculated according to the ratios of the dimensions as illustrated by the following:

$$s_H = \frac{H_M}{H_T} \tag{1}$$

$$s_W = \frac{W_M}{W_T} \tag{2}$$

For a pixel at position $(x_T, y_T)$ in the target image, its corresponding mapped location in the mask image can be determined by multiplying the x dimension by the width scaling factor ($s_w$) and by multiplying the y dimension by the vertical scaling factor ($s_H$). Thus, the pixel position ($x_T$, $y_T$) 215 in the target image maps to the location ($s_w x_T$, $s_H y_T$) 220 in the masked image. However, it should be noted that in some instances there may not be a pixel at location ($s_W x_T$, $s_H y_T$) in the masked image. Thus, in embodiments, bi-linear interpolation can be used to obtain a pixel color value for the mapped pixel location ($s_W x_T$, $s_H y_T$) 220. The four nearest pixel neighbors (225, 230, 235, and 240) in the mask image 210 to the mapped pixel location ($s_W x_T$, $s_H y_T$) 220 are identified and the color values of those pixels are used to interpolate a color value for the mapped location ($s_W x_T$, $s_H y_T$) 220. Thus, using scaling and bi-linear interpolation, a mapping that correlates the pixels between the two images can be obtained. One skilled in the art shall recognize that other methods of mapping may be used and that no particular method of mapping is critical to the present invention. One skilled in the art shall recognize that other mapping methods may be employed, including by way of example and not limitation, nearest neighbor interpolation and bicubic interpolation.

Warper or projector 150 is configured to warp or project an image to the 3D rigid parametric model and from the model to an image. Because the target image is used to construct the rigid parametric model, it is known how each pixel in the target image is warped or projected onto the model surface. By replacing the target image with the mapped mask image, the mapped mask image can be warped onto the model surface, which creates a 3D model of the virtual mask. Using the pose information of the target image in a captured image determined by the 3D pose estimator 140, projector 150 projects an adjusted mapped mask image to the captured image to form a composite or output image 180.

As mentioned above, in embodiments, the three-dimensional pose estimator 140 estimates three-dimensional pose information (orientation and location) of the target image in an image. In embodiments, the three-dimensional pose estimator 140 is a real-time three-dimensional tracker based on user-adaptive rigid parametric model, such as cylindrical models. After obtaining the target image region (e.g., a face region) in an initial frame using a frontal face detector, the pose estimator 140 automatically constructs the user-adaptive cylindrical model and recovers the full three-dimensional face movements (three rotations and three translations) across some or all of a set of captured image (e.g., a video) by fitting the model to the images. In embodiments, real-time efficiency is achieved due to the simplicity of the cylindrical shape model, and robustness to noise, occlusion, and gradual illumination changes is achieved using an intelligent color mapping scheme. For example, in embodiments, a pixel color distribution of the target face image is computed and a color mapping table is calculated such that after mapping the target colors are preserved and all the other colors are mapped to zero intensity or close to zero intensity. When a new image is color mapped using this table, only the new target pixels would remain the original colors and all the other pixels would become black. Fitting the model with such an image is then more efficient and robust. In embodiments, robust statistics methods may also be employed, such as (by way of example and not limitation) disclosed in commonly-owned U.S. patent application Ser. No. 12/174,513, entitled "Model-Based Error Resilience In Data Communication," filed on Jul. 16, 2008, listing Anoop Bhattacharjya and Jing Xiao as inventors, which application is hereby incorporated by reference in its entirety.

Obtaining motion information of an object in an image, such as a head, may be obtained by using dynamic templates and re-registration techniques. For example, in embodiments, given an initial reference template of a head image (i.e., an initial target image) and the corresponding head pose, a head model can be created and the head motion can be recovered from an input video. Assume, for purposes of explanation, an input image, I, which comprises an array of pixel values at a given time. The image may be denoted as I(u, t), where u=(u, v) represents a pixel in the image at time t. At time interval t+1, the item represented by pixel u at time t moves in the image to a new pixel location, u'. The new position of the pixel may be represented by the equation:

$$u' = F(u, \mu), \tag{3}$$

where $\mu$ represents a motion parameter vector and $F(u,\mu)$ represents a parametric motion model (such as the affine motion) that maps the pixel u to the new location pixel location u'.

In embodiments, it is assumed that the color of the item represented by pixel u at time t does not change when it moves to the new location pixel location u' at time t+1. Thus, if the color values of the item represented in the image do not change between time intervals, the following equation holds true:

$$I(u', t+1) = (I(F(u,\mu), t+1) = I(u,t)) \tag{4}$$

In embodiments, the motion vector $\mu$ may be obtained by minimizing the difference between pixels at time t and time t+1. Minimization may be achieved by adjusting the motion parameters. In embodiments, the motion vector $\mu$ can be obtained by minimization of the following objective function:

$$\min E(\mu) = \sum_{u \in \Omega} (I(F(u, \mu), t+1) - I(u, t))^2 \tag{5}$$

where $\Omega$ is the region of the template at time t. That is, only the pixels within the region $\Omega$ are taken into account for motion recovery. In the example in which the template is the target image of a face, the initial reference template face image is a rectangular shape image patch. Thus, the region is defined by the rectangle.

For simplicity of notation, u and t are omitted in some of the following equations.

In general, this class of problems can be solved by using a gradient descent method, such as by way of example and not limitation, the Lucas-Kanade method:

$$\mu = -\left(\sum_{\Omega} (I_u F_\mu)^T (I_u F_\mu)\right)^{-1} \sum_{\Omega} (I_t (I_u F_\mu)^T) \tag{6}$$

where $I_t$ represents the temporal image gradient, $I_u$ represents the spatial image gradient, and $F_\mu$ represents the partial differential of F with respect to $\mu$, which depends on the motion model and is computed at $\mu=0$.

It should be noted that because Equation (6) comes from the linear approximation of Equation (5) by a first-order Taylor expansion, this process has to be iterated. At each iteration, the incremental motion parameters are computed, the template is warped using the incremental transformation, and the warped template is used for the next iteration. This process continues until the solution converges. When the process converges, the motion may be recovered from the composition of the incremental transformations rather than from adding up the incremental parameters directly.

In embodiments, different weights may be assigned to pixels in the template to account for outliers and non-uniform density. For example, Equation (6) may be modified as follows to include weighting factors:

$$\mu = -\left(\sum_\Omega w(I_u F_\mu)^T (I_u F_\mu)\right)^{-1} \sum_\Omega (w(I_t (I_u F_\mu)^T)) \quad (7)$$

In embodiments, weighting factors may be determined using the warped template and iteratively re-weighted least squares.

Motion Recovery under Perspective Projection. The rigid motion of an item point $X=[x,y,z,1]^T$ between time t and t+1 can be represented according to the following equation:

$$X(t+1) = M \cdot X(t) = \begin{bmatrix} R & T \\ 0 & 1 \end{bmatrix} \cdot X(t) \quad (8)$$

$R_{3\times 3}$ is the rotation matrix with 3 degrees of freedom and $T_{3\times 1}$ is the three-dimensional translation vector. The full item motion has 6 degrees of freedom.

Assuming small rotations between image frames, the transformation M can be represented as:

$$M = \begin{bmatrix} 1 & -\omega_z & \omega_y & t_x \\ \omega_z & 1 & -\omega_x & t_y \\ -\omega_y & \omega_x & 1 & t_z \\ 0 & 0 & 0 & 1 \end{bmatrix} \quad (9)$$

where $[\omega_x, \omega_y, \omega_z]$ represents the rotations relative to the three axes, and $[t_x, t_y, t_z]$ the three-dimensional translation T.

Under perspective projection (assuming the camera projection matrix depends only on the focal length), the image projection u of $X(=[x,y,z,1]^T)$ at t+1 is:

$$u(t+1) = \begin{bmatrix} x - y\omega_z + z\omega_y + t_x \\ x\omega_z + y - z\omega_x + t_y \end{bmatrix} \cdot \frac{f_L}{-x\omega_y + y\omega_x + z + t_z} \quad (10)$$

where $f_L$ represents the focal length. In embodiments, the focal length may be estimated as follows. Assuming the distance between the face and the camera is about six times the face width in the 3D space and the face width in the image is l pixels, then the focal length is 6 l (i.e., six times the face width in the camera image plane). Equation (10) is the parametric motion model F(•) in Equation (4) with the six-dimensional full-motion parameter vector $\mu=[\omega_x, \omega_y, \omega_z, t_x, t_y, t_z]$. It should be noted that $t_z$ is included in Equation (10), so the translations along the depth direction can also be recovered.

$F_\mu$ is initially computed at $\mu=0$, which yields the following equation:

$$F_\mu|_{\mu=0} = \begin{bmatrix} -xy & x^2+z^2 & -yz & z & 0 & -x \\ -(y^2+z^2) & xy & xz & 0 & z & -y \end{bmatrix} \cdot \frac{f_L}{z^2}(t) \quad (11)$$

After each iteration, the incremental transformation is computed using u. The final transformation matrix is obtained from the composition of the incremental transformations, and the full head motion is recovered from this final transformation matrix. The new head pose may be computed from the composition of the previous pose and the current transformation.

Given the pose information of a target image in a captured image determined by the 3D pose estimator 140, a mapped mask image that has been warped to the model can be adjusted according to the pose information. The adjusted warped mapped masked image is projected by projector 150 to the captured image to form a composite or output image 180. One skilled in the art shall recognize that the adjustment to the warped mapped masked image may be performed as part of the projection process.

In embodiments, using the recovered pose information, the cylindrical model is moved to be at the same position and orientation such that the warped mapped mask matches the pose of the target image in the captured image. The virtual mask can be placed onto the target item by projecting the mask image and blending it and the captured image. Blending is performed by image blender 160. In embodiments, blender 160 blends the projected mask image and the captured image by directly replacing the pixel color in the captured image with the color of the corresponding pixel in the projected mask image. Alternatively, other forms of blending may be employed by blender 160. In embodiments, blender 160 may use weighted sums of the two images to form the composite image 180. In embodiments, the weight at a pixel location may depend on the distance of the pixel location from the boundary of the mask image. For example, in embodiments, the closer to the boundary a pixel is, the bigger the weight is of the captured image and the smaller the weight is of the projected mask image. In an embodiment, for each pixel in the target image area, the blended color may be determined as:

$$I_b = w * I_c + (1-w) * I_m, \quad (12)$$

where $I_c$ and $I_m$ are the colors of the pixel in the captured image and mask image respectively. And, the weight, w, may be computed according to the following:

$$w = e^{-32 * \left(\frac{d}{D}\right)^2} \quad (13)$$

where d is the distance from the mask boundary and D equals half of the width of the mask image. When d is larger than a quarter of D, the weight is smaller than $e^{-2}=0.1353$. Thus, the transition area, where the blended image smoothly changes from the captured image to the projected mask image, is not wide, merely around one eighth of the target image width. Yet, it is generally sufficient to eliminate undesirable sharp boundary around the virtual mask. One skilled in the art shall recognize that other methods for blending may be employed by image blender 160 and such methods are within the scope of the present invention.

C. Methods for Masking an Item Within an Image

Figure 3:
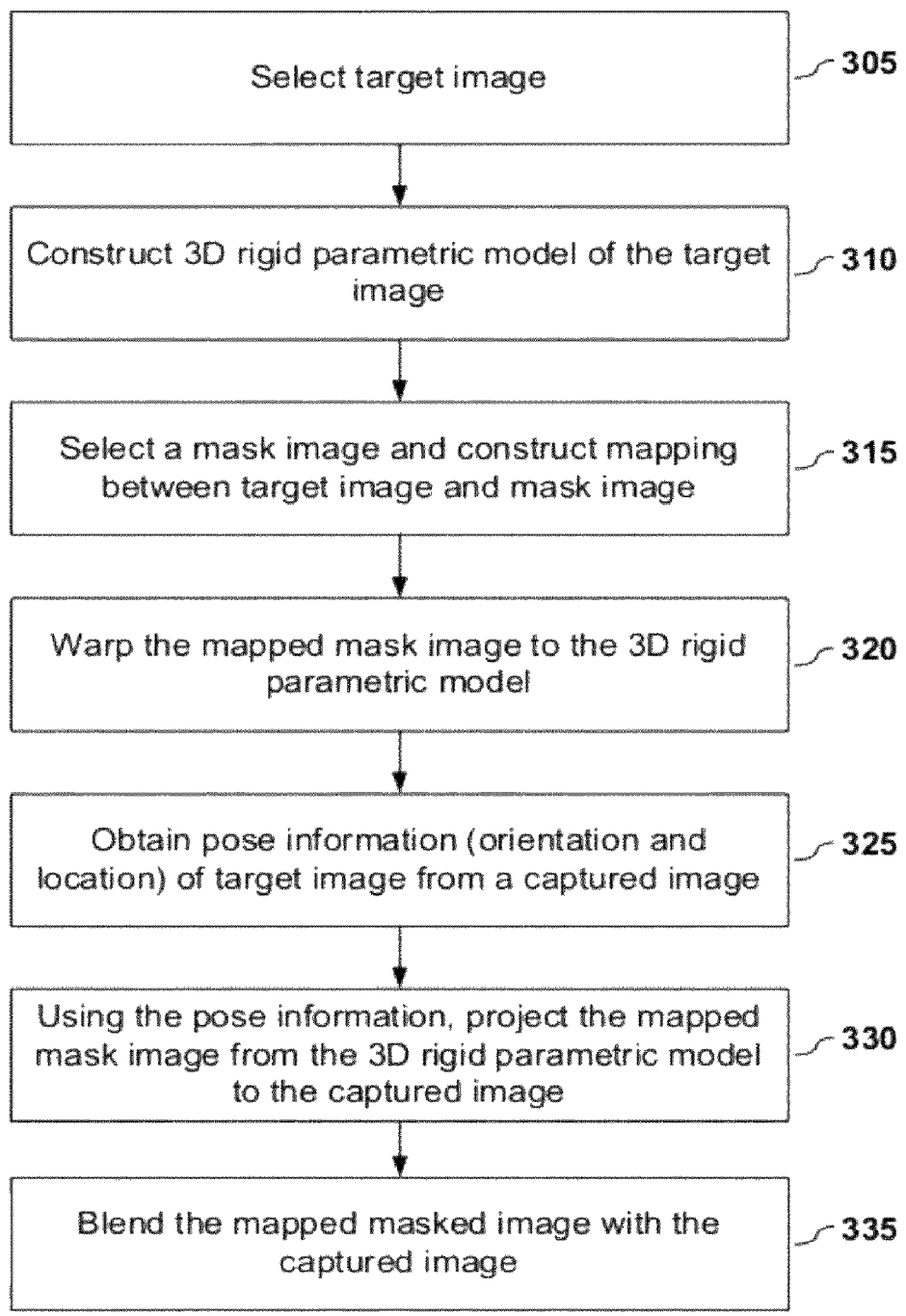
FIG. 3 depicts a method for masking an item in an image or images according to embodiments of the present invention.

FIG. 3 depicts a method 300 for masking an item in an image or images according to embodiments of the present invention. Method 300 may be implemented in embodiments of virtual masking system 100. One skilled in the art shall recognize that the steps of the method 300 depicted in FIG. 3 may be re-ordered and/or may be performed in parallel. Accordingly, the present invention is not limited to the exact ordering of the embodiment depicted in FIG. 3.

In the embodiment depicted in FIG. 3, a target image is selected 305. As noted previously with regards to virtual masking system 100, the selection of the target image may be performed automatically or may be performed by a user. For example, a user may identify a target image by selecting a portion of the image (e.g., highlighting the portion, clicking and dragging over the portion, selecting points to define a region, etc.). In embodiments, an automated detector may identify a target image from within an image. For example, a face detector may be employed to detect a face target image. One skilled in the art shall recognize that any of a number of face recognition or item recognition methods or systems may be employed to select a target image and that no particular method or system is critical to the present invention.

Given a selected target image, a three-dimensional rigid parametric model of the selected target image is constructed 310. A rigid parametric model may be created using an initial target image of an item and its corresponding pose. In embodiments, the initial pose may be assumed to be frontal. Consider, by way of illustration and not limitation, the following example. Given a rectangular target image and its pose, a three-dimensional cylindrical model may be generated using the dimensions of the target image. In embodiments, the target image height is used to calculate the height of the cylindrical model, and the target image width is used to calculate the cylindrical model radius.

FIG. 6 illustrates an embodiment of a method for defining the geometry of the cylindrical model. As illustrated in FIG. 6, given a target face image 605 having a height H and a width W, the cylindrical model height may be set as H and its radius r may be set as $W/(2*\sin(\theta))$. In the depicted embodiment, given a plane that is parallel to the central axis 660 of the cylinder and positioned such that the intersection of the plane and the cylinder produces a rectangular intersection having height H and width W, the angle $\theta$ is the interior angle between the line that bisects the width W of the rectangular intersection and terminates at the central axis 660 of the cylinder and the radius line that commences at the central axis 660 and terminates at a corner 650/655 of the rectangular intersection. In embodiments, $\theta$ is set as 60 degrees. It should be noted that other geometric model configurations may be used and other $\theta$ values may be used.

A mask image is selected and a mapping is constructed 315 between the mask image and the selected target image. In embodiments, the mask image may be selected 315 from a library or list of images, may be provided by a user, and/or may be selected by a user from within an image. In embodiments, selection of the image may be done by default (i.e., a default mask image is set).

In embodiments, the mapping between the target image and the mask image may be constructed 315 by scaling the mask image and/or the target image such that the images have the same size, thereby creating a mapping between the images. In embodiments, scaling and bi-linear interpolation may be used to generate the mapping between the mask image and the target image. For example, height and width scaling factors $s_H$ and $s_W$ may be calculated using Equation (1) and Equation (2). For a pixel at position $(x_T, y_T)$ in the target image, its corresponding mapped location $(s_W x_T, s_H y_T)$ in the mask image may be determined by multiplying the x dimension by the width scaling factor $(s_W)$ and by multiplying the y dimension by the vertical scaling factor $(s_H)$. In instances were no pixel directly corresponds at location $(s_W x_T, s_H y_T)$ in the masked image, bi-linear interpolation may be used to obtain a pixel color value for the mapped pixel location $(s_W x_T, s_H y_T)$. The nearest pixel neighbors in the mask image to the mapped pixel location $(s_W x_T, s_H y_T)$ are identified and the color values of those pixels may be used to interpolate a color value for the mapped location $(s_W x_T, s_H y_T)$. Thus, using scaling and bi-linear interpolation, a mapping that correlates the pixels between the two images may be obtained. One skilled in the art shall recognize that other methods of mapping may be used and that no particular method of mapping is critical to the present invention. One skilled in the art shall recognize that other mapping methods may be employed, including by way of example and not limitation, nearest neighbor interpolation and bicubic interpolation.

In embodiments, a mapped mask image may be projected or warped 320 onto the three-dimensional rigid parametric model. Because the target image is used to construct the rigid parametric model, it is known how each pixel in the target image is warped or projected onto the model surface. By replacing the target image with the mapped mask image, the mapped mask image can be warped onto the model surface, which creates a three-dimensional model of the virtual mask.

Consider, by way of illustration, the embodiment depicted in FIG. 6. FIG. 6 depicts an example target image, an example mapped mask image, and an example warped mapped mask image according to embodiments of the present invention. Within image 610, the target image 605 selected from the initial image 610 is a frontal face image of a pretty young girl. The target image 605 has rectangular dimensions of H×W, which are used to construct a three-dimensional rigid parametric model of the target image. FIG. 6 depicts a cylindrical shape model 635 constructed based on the specified frontal face rectangle 605.

Using the target image 605 dimensions (H×W), scaling, and bi-linear interpolation, a mapping 620 is developed between the target image 605 and a mask image 625. The face image 625 represents the original facial mask image, where the black color labels 626 the transparent pixels. Transparent pixels 626 will allow the target image pixels in those pixel locations to be visible once the mask image is projected onto a captured image, such as image 610. A three-dimensional model of the virtual facial mask 645 can be constructed by warping 640 the mapped masked image onto the cylindrical model 635.

Returning to FIG. 3, three-dimensional pose (orientation and location) information of the target image within a capture image may be estimated 325 from motion information associated with the target image. In embodiments, motion information of an object in an image may be obtained as discussed above with respect to system 100.

Having obtained the pose information of how the target image has moved between the initial image and the captured image, the mapped mask image from the three-dimensional rigid parametric model may be adjusted according to the obtained pose information of the target image within a captured image. That is, using the recovered pose information, the cylindrical model is moved to be at the same position and orientation such that the warped mapped mask matches with the captured target image. The virtual mask can be placed onto the target item by projecting 330 the mask image onto the captured image to form a composite or output image. One skilled in the art shall recognize that the adjustment to the warped mapped masked image may be performed as part of the projection process. For example, in embodiments, using the three-dimensional pose information of the target item in the captured image, at least some of the pixels of the warped mapped mask image are projected to pixel locations in the captured image. The projection represents a correlation or correspondence between pixels in the warped mapped mask image and the composite image, and from the projection a composite image can be formed. The composite image is a combination of at least part of the captured image and at least part of the projected warped mapped mask image, wherein the target item in the captured image is at least partially masked by at least a portion of pixels projected from the warped mapped mask image.

Figure 4:
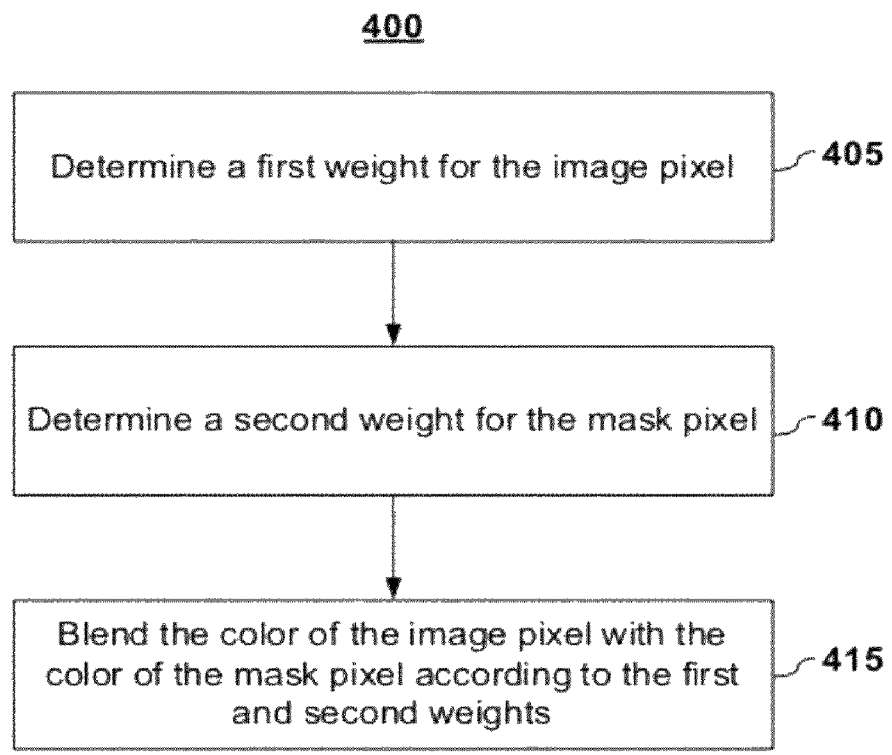
FIG. 4 depicts a method for blending the pixels of a captured image and a mask image according to embodiments of the present invention.

In embodiments, in forming the output or composite image, the projected mask image may be blended 335 with the captured image. FIG. 4 depicts a method 400 for blending the pixels of a captured image and a mask image according to embodiments of the present invention. Method 400 may be implemented as step 335 in embodiments of method 300.

In embodiments, the weighted sum of the two images may be used to form the composite image. The weighted sum of the two images may be computed by determining 405 a first weight for an image pixel in the captured image, determining 410 a second weight for a corresponding projected mask pixel, and blending 415 the color of the captured image pixel with the color of the mask pixel according to the first and second weights. In embodiments, the weight of a pixel may depend on the distance of the pixel from the boundary of the mask image. For example, in embodiments, the closer to the boundary a pixel is, the bigger the weight is of the captured image and the smaller the weight is of the projected mask image. In embodiments, the blended color for pixels in the composite image may be calculated according to Equation (12) and Equation (13), above. In embodiments, blending the projected mask image and the captured image may be performed by directly replacing the pixel color in the captured image (i.e., setting its weight to 0) with the color of the corresponding pixel in the projected mask image (i.e., setting its weight to 1). Those skilled in the art will recognize that other forms of blending may be employed.

Figure 5:
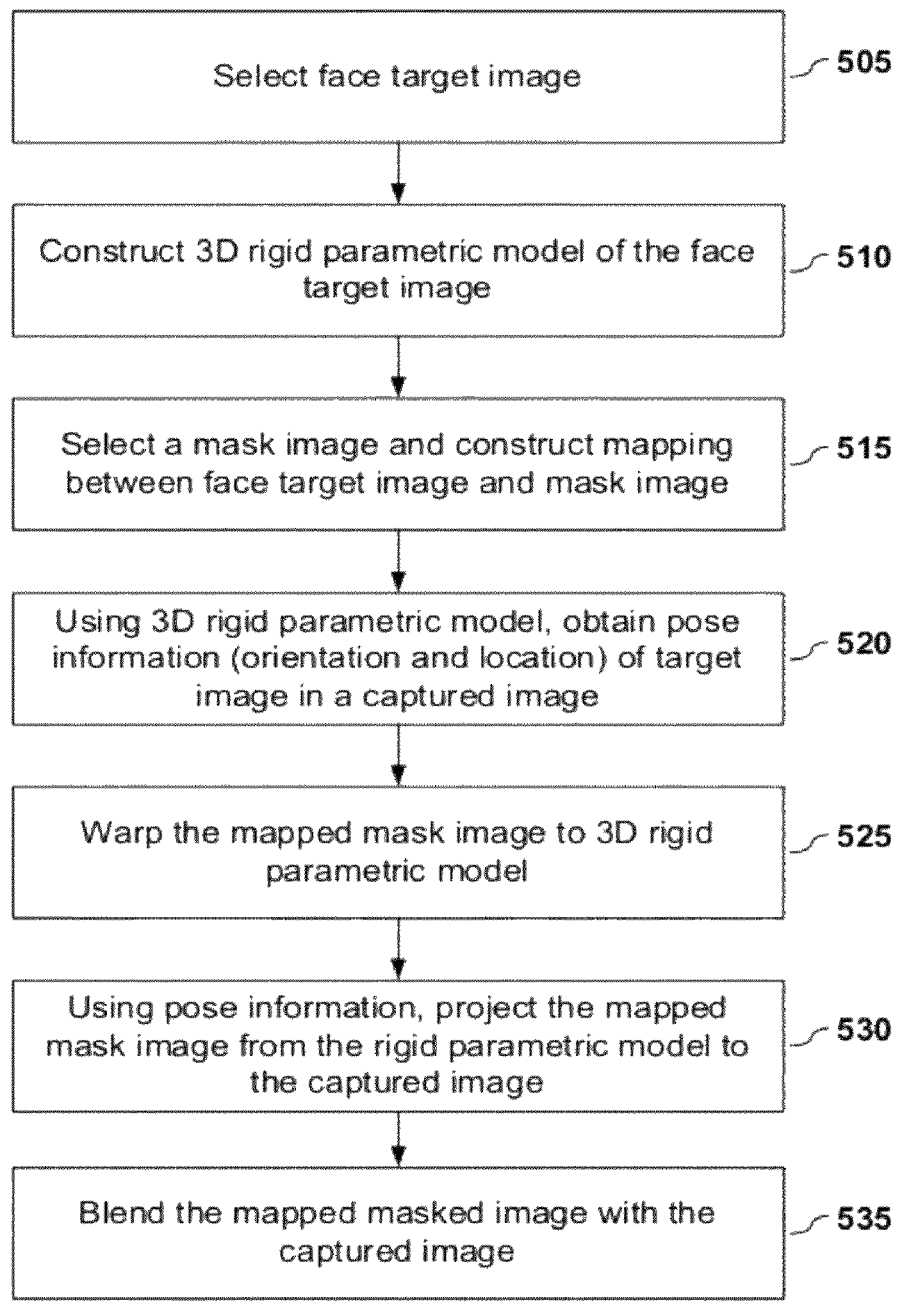
FIG. 5 depicts a method for masking a face in an image or images according to embodiments of the present invention.

FIG. 5 depicts a method 500 for masking a face in an image or images according to embodiments of the present invention. Method 500 is an embodiment of the method 300 depicted in FIG. 3. As depicted in FIG. 5, a face image is selected 505 and a three-dimensional rigid parametric model of the face image is constructed 510. A mask image is selected and a mapping between face image and the mask image is constructed 515. Pose information (orientation and location) of the face image in a captured image 520 is determined as discussed previously. In embodiments, the captured image may represent a subsequent image frame from a video. The mapped mask image is warped 525 to the three-dimensional rigid parametric model, adjusted according to the obtained pose information, and projected 530 onto the captured image to form a composite image. In embodiments, the projected mask may be blended 535 with captured image to form the composite or output image.

Figure 7:
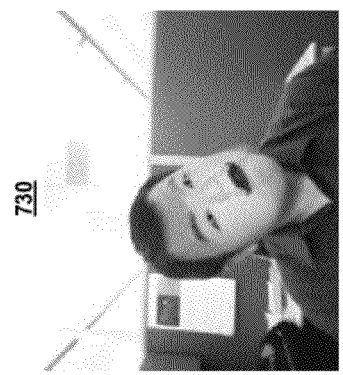
FIG. 7 depicts an example of a captured image, which includes a target face image, a mask image, and a composite image wherein the target face image has been replaced by the mask image according to embodiments of the present invention.
Figure 7:
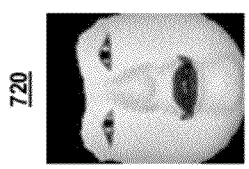
Figure 7:
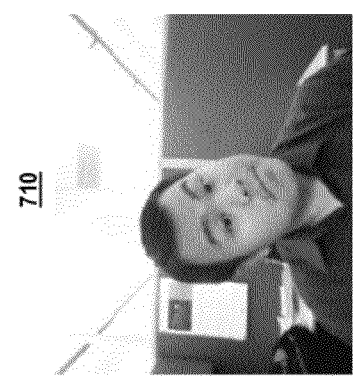
Figure 8:
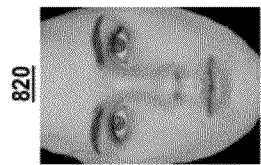
FIG. 8 depicts an example of a captured image, which includes a target face image, a mask image, and a composite image wherein the target face image has been replaced by the mask image according to embodiments of the present invention.
Figure 8:
Figure 8:
Figure 9:
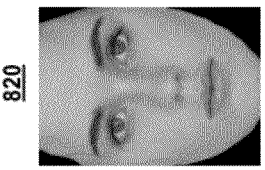
FIG. 9 depicts an example, using the same mask image as in FIG. 8, of another captured image and the resulting composite image, wherein the target face image has been replaced by the mask image according to embodiments of the present invention.
Figure 9:
Figure 9:

FIGS. 7, 8, and 9 show three examples of virtual masking according to embodiments of the present invention. FIG. 7 depicts an example of a captured image 710, a mask image 720, and a composite image 730, wherein the target face image has been replaced by the mask image according to embodiments of the present invention. FIG. 8 depicts an example of a captured image 810, a mask image 820, and a composite image 830, wherein the target face image has been replaced by the mask image according to embodiments of the present invention. And, FIG. 9 depicts an example, using the same mask image as in FIG. 8, of another captured image 910 and the resulting composite image 930, wherein the target face image has been replaced by the mask image 820 according to embodiments of the present invention. In each example, it can be seen that the virtual mask is very well blended with the captured image and the three-dimensional face motion is also well compensated.

D. Implementations

It shall be noted that the present invention may be implemented in hardware, software, firmware, or any combination thereof. Embodiments of the present invention may also be implemented in any instruction-execution/computing device or system capable of processing the data, including without limitation, a general-purpose computer and a specific computer, such as one intended for data processing. The present invention may also be implemented into other computing devices and systems, including without limitation, cameras, multiple function devices, multimedia devices, gaming systems, and any other device that processes, captures, transmits, or stores data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
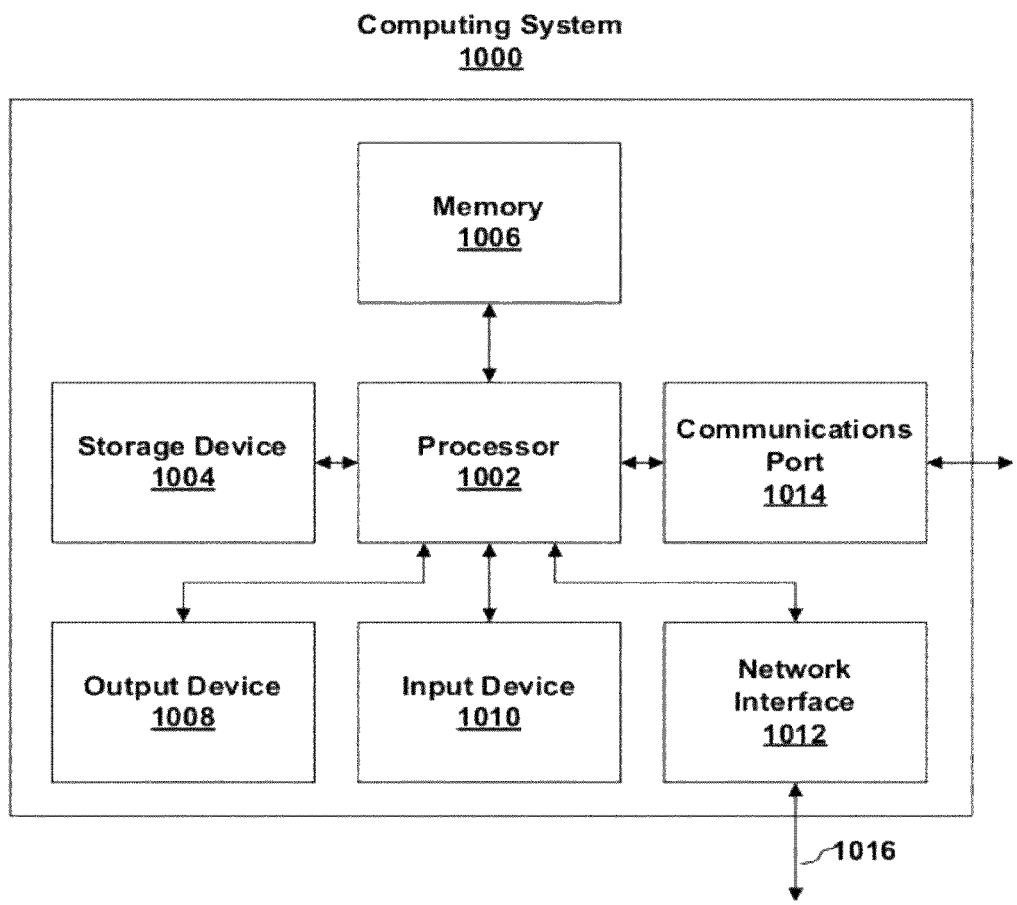
FIG. 10 depicts a block diagram of an example of a computing system according to embodiments of the present invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a computer-readable media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In embodiments, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIG. 1 may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, communicatively coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for masking a target item by a processing device within an image, the method comprising the steps of:
    (a) defining a target image encompassing said target item within an input image;
    (b) defining a mask image with which to mask said target item;
    (c) scaling the size of a three-dimensional rigid parametric model to the size of the target image within said input image;
    (d) determining the projection of said target image to the scaled rigid parametric model to establish a pixel correlation between image pixel locations in said target image and corresponding projected pixel locations on said scaled rigid parametric model;
    (e) constructing a pixel mapping between said mask image and the target image to obtain a mapped mask image with a one-to-one pixel correspondence between image pixels in said target image and image pixels in said mapped mask image;
    (f) determining the projection of said mapped mask image to the scaled rigid parametric model in accordance with said pixel correspondence between said target image and said mapped mask image and said pixel correlation between image pixel locations in said target image and corresponding projected pixel locations on said scaled rigid parametric model;
    (g) replacing said target item within said input image with a composite of said target image and the mapped mask image in accordance with said pixel correspondence between said target image and said mapped mask image and said pixel correlation between image pixel locations in said target image and corresponding projected pixel locations on said scaled rigid parametric model, said, composite image being a weighted sum of the target image and the mapped mask image
    wherein the weighted sum of the target image and the mapped mask image is defined as $I_b = W*I_c + (1-w)*I_m$, where $I_c$ is a given pixel in the target image, $I_m$ is its corresponding pixel in the mapped mask image, and $I_b$ is the resultant pixel in the composite image; and
    w is the weight defined as $$w = e^{-32*\left(\frac{d}{D}\right)^2},$$

where d is the pixel's distance from the mask boundary and D equals half of the width of the mapped mask images.

2. The method of claim 1, wherein said input image is a first in a sequence of frame images within a video sequence, and in step (a) said target image encompassing a frontal view of said target item, said method further comprising;
    defining a three-dimensional tracker based on said scaled rigid parametric model to recover three-dimensional movements of said target item across said frame images; and
    for each subsequent frame image following said input image:
        (i) aligning said projection of said target image and said projection of said mapped mask image according to the three-dimensional orientation of said scaled rigid parametric model as determined by said three-dimensional tracker; and
        (ii) replacing the target item within the current frame image with a composite of said target image and the mapped mask image in accordance with said pixel correspondence between said target image and said mapped mask image and said pixel correlation between image pixel locations in said target image and corresponding projected pixel locations on said scaled rigid parametric model, said composite image being a weighted sum of said target image and the mapped mask image.

3. The method of claim 1, wherein the shape of said three-dimensional rigid parametric model is independent of the shape of said target item.

4. The method of claim 1, wherein said three-dimensional rigid parametric model is a rigid geometric shape.

5. The method of claim 4, wherein said rigid geometric shape is a cylinder.

6. The method of claim 1, wherein the shape of the perimeter of said target image is defined by a two-dimensional side view of said three-dimensional rigid parametric model.

7. The method of claim 6, wherein in step (c), the three-dimensional rigid parametric model is scaled to the size of the target image within said input image by being made as large as possible while still fitting within perimeter of said target image.

8. The method of claim 6, wherein:
said three-dimensional rigid parametric model is a cylinder and said target item is not a cylinder;
the perimeter shape of said target image is a quadrilateral with four right angles having a height H and a width W; and
in step (c) the size of said three-dimensional rigid parametric model is scaled to the size of the target image by setting the height of said cylinder to H and setting the radius of said cylinder to W/(2*sin(θ)).

9. The method of claim 8, wherein θ equals 60 degrees.

10. The method of claim 1, wherein step (e) includes scaling said mask image to the size of said target image, and the defining of said mapped mask image includes identifying corresponding pixels between said target image and said scaled mask image based on their common relative location within their respective image.

11. The method of claim 10, wherein the pixel density of the scaled mask image is different than the pixel density of said target image, the defining of said mapped mask image further includes:
when no corresponding pixel in said scaled mask image is identifiable for a given pixel in said target image based on relative pixel location each respective image, a new pixel is defined within said mapped mask image to maintain said one-to-one correspondence by pixel interpolation of a predefined number of neighbor pixels of said scaled mask image nearest to the corresponding relative location within the scaled mask image.

12. The method of claim 2, wherein in said target item is a human face and in step (a), the defining of said target image is automated by means of a face detector.

13. The method of claim 1, wherein in step (g), the weight of a given pixel in the target image and the weight of its corresponding pixel in the mapped mask image is dependent upon the given pixel's distance to the mask boundary, wherein the closer the given pixel is to the mask boundary the greater the weight assigned to the pixel in the target image and smaller the weight assigned to the corresponding pixel in the mapped mask image.

14. A non-transitory computer-readable medium comprising one or more sequences of instructions which, when executed by one or more processors, cause the one or more processors to perform at least the steps of claim 1.

15. A system for masking a target item within an image, the system comprising:
an item detector for-defining a target image encompassing said target item within an input image;
a mask definer foe-defining a mask image with which to mask said target item;
a scaler foe-scaling the size of a three-dimensional, rigid parametric model to the size of the target image within said input image, wherein the shape of said rigid parametric model is independent of the shape of said target image;
a projector foe-determining the projection of said target image to the scaled rigid parametric model to establish a pixel correlation between image pixel locations in said target image and corresponding projected pixel locations on said scaled rigid parametric model; and
a mapper constructing a pixel mapping between said mask image and the target image to obtain a mapped mask image with a one-to-one pixel correspondence between image pixels in said target image and image pixels in said mapped mask image;
said projector further determining the projection of said mapped mask image to the scaled rigid parametric model in accordance with said pixel correspondence between said target image and said mapped mask image and said pixel correlation between image pixel locations in said target image and corresponding projected pixel locations on said scaled rigid parametric model;
said projector further replacing said target item within said input image with a composite of said target image and the mapped mask image in accordance with said pixel correspondence between said target image and said mapped mask image and said pixel correlation between image pixel locations in said target image and corresponding projected pixel locations on said scaled rigid parametric model, said composite image being a weighted sum of the target image and the mapped mask image;
wherein:
wherein the weighted sum of the target image and the mapped mask image is defined as $I_b = W^* I_c + (1-w)^* I_m$, where $I_c$ is a given pixel in the target image, $I_m$ is its corresponding pixel in the mapped mask image, and $I_b$ is the resultant pixel in the composite image; and
w is the weight defined as $$w = e^{-32*\left(\frac{d}{D}\right)^2},$$

where d is the pixel's distance from the mask boundary and D equals half of the width of the mapped mask images.

16. The system of claim 15, wherein:
the shape of said rigid parametric model is a rigid geometric shape;
said input image is a first in a sequence of frame images within a video sequence; and
said target image encompasses a frontal view of said target item;
said system further having a data processing unit defining a three-dimensional tracker based on the rigid parametric model to recover three-dimensional movements of said target item across said frame images; and
for each subsequent frame image following said input image:
(i) aligning said projection of said target image and said projection of said mapped mask image according to the three-dimensional orientation of said scaled rigid parametric model as determined by said three-dimensional tracker; and
(ii) replacing the target item within the current frame image with a composite of said target image and the mapped mask image in accordance with said pixel correspondence between said target image and said mapped mask image and said pixel correlation between image pixel locations in said target image and corresponding projected pixel locations on said scaled rigid parametric model, said composite image being a weighted sum of said target image and the mapped mask image.

17. The system of claim 15, wherein:
said rigid geometric shape is a cylinder;
the perimeter shape of said target image is a quadrilateral with four right angles having a height H and a width W; and
said scaler scales the size of the three-dimensional rigid parametric model is scaled to the size of the target image by setting the height of said cylinder to H and setting the radius of said cylinder to $W/(2*\sin(\theta))$, wherein $\theta$ is fixed at a predefined angle value.

18. The system of claim 15, wherein said mapper scales said mask image to the size of said target image, the pixel density of the scaled mask image being different than the pixel density of said target image, and the defining of said mapped mask image includes:
  (i) identifying corresponding pixels between said target image and said scaled mask image based on their common relative location within their respective image; and
  (ii) when no corresponding pixel in said scaled mask image is identifiable for a given pixel in said target image based on relative pixel location each respective image, a new pixel is defined within said mapped mask image to maintain said one-to-one correspondence by pixel interpolation of a predefined number of neighbor pixels of said scaled mask image nearest to the corresponding relative location within the scaled mask image.

* * * * *